US006376756B1

(12) United States Patent
Beckmeier

(10) Patent No.: US 6,376,756 B1
(45) Date of Patent: Apr. 23, 2002

(54) STRINGED MUSICAL INSTRUMENT WITH SUBSTITUABLE FINGERBOARDS

(76) Inventor: Fred Beckmeier, 1183 Aztec, Topanga, CA (US) 90290

(*) Notice: Subject to any disclaimer, the term of this patent is extended or adjusted under 35 U.S.C. 154(b) by 0 days.

(21) Appl. No.: 09/549,736

(22) Filed: Apr. 14, 2000

Related U.S. Application Data

(63) Continuation-in-part of application No. 09/531,719, filed on Mar. 20, 2000, which is a continuation of application No. 09/273,179, filed on Mar. 19, 1999, now Pat. No. 6,156,961, which is a continuation-in-part of application No. 09/161,246, filed on Sep. 25, 1998, now Pat. No. 6,037,532.

(60) Provisional application No. 60/089,776, filed on Jun. 18, 1998.

(51) Int. Cl.[7] .................................................. G01D 3/00
(52) U.S. Cl. ....................................... 84/293; 84/314 R
(58) Field of Search ................................ 84/293, 314 R

(56) References Cited

U.S. PATENT DOCUMENTS 4,132,143 A * 1/1979 Stone ........................ 84/314 R
4,137,813 A * 2/1979 Stone et al. .............. 84/314 R
4,297,936 A * 11/1981 Mouton ..................... 84/314 R
4,722,260 A * 2/1988 Pigozzi ...................... 84/314 R
4,852,450 A * 8/1989 Novak ...................... 84/314 R

* cited by examiner

*Primary Examiner*—Jeffrey Donels

(57) ABSTRACT

A stringed musical instrument having an elongate neck and a body which may have a resonant cavity at one end and a head at the other end thereof. Strings extend across the neck and, when vibrated, generate musical sounds. The fingerboards are removable so that one fingerboard may be substitutable for another type of fingerboard in order to generate sounds of different timber or of different qualities. In particular, fretted fingerboards are substitutable for non-fretted fingerboards. Moreover, and in a preferred embodiment, the fingerboards are inserted onto the neck of the instrument by shifting the fingerboard laterally with respect to and overlying the neck of the musical instrument and then by sliding the fingerboard longitudinally with respect to the neck of the instrument and into and out of engagement with an interlocking element on the neck of the instrument. In a preferred embodiment of the invention, a longitudinally extending upstanding projection having double tapered walls is located on the neck of the musical instrument and a corresponding groove is formed on the underside of the fingerboard to permit an interlocking arrangement of the fingerboard on the neck of the musical instrument. Compensation in the thickness of fretted and non-fretted fingerboards is also provided to insure that the strings of the instrument are only moved the same distance with either fingerboard.

14 Claims, 5 Drawing Sheets

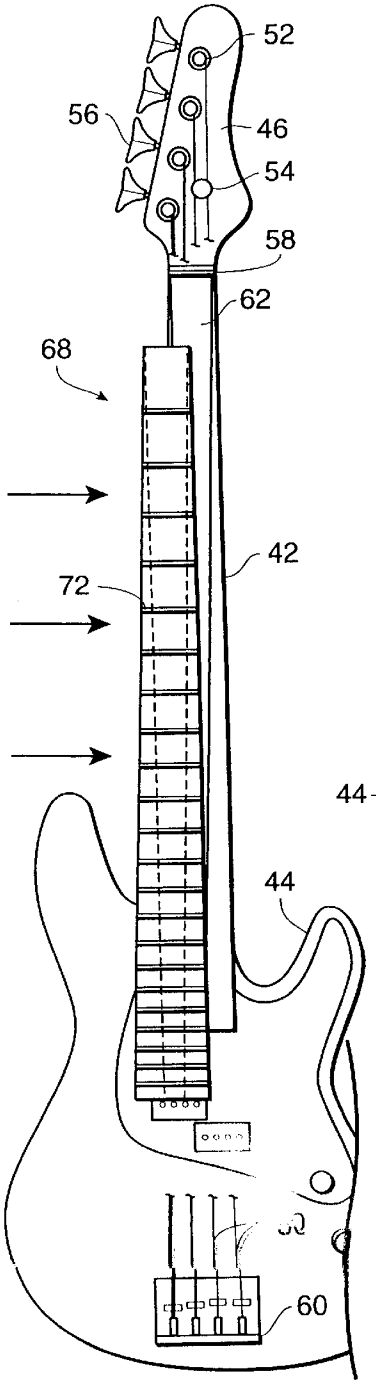
FIG. 2
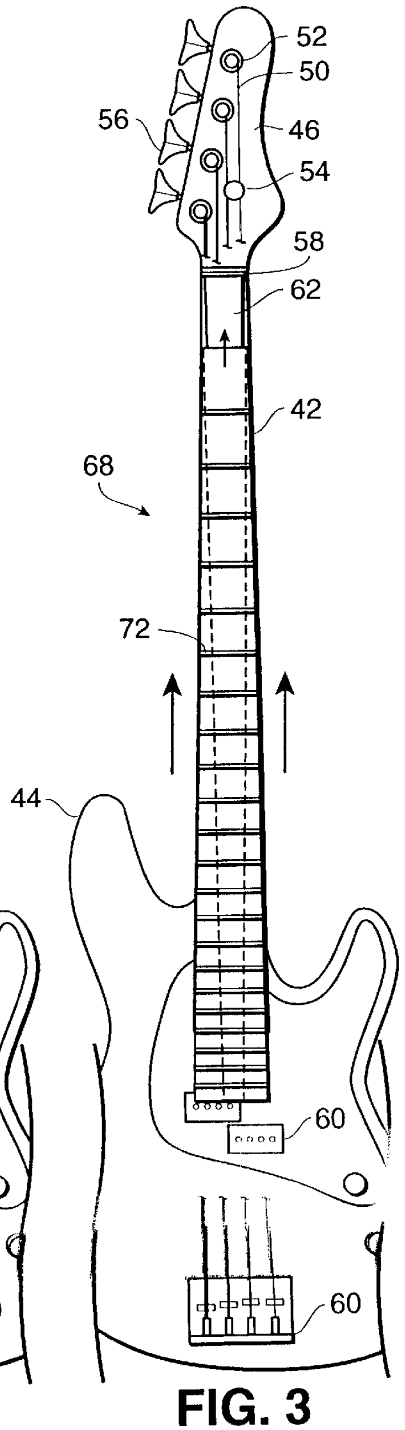
FIG. 3
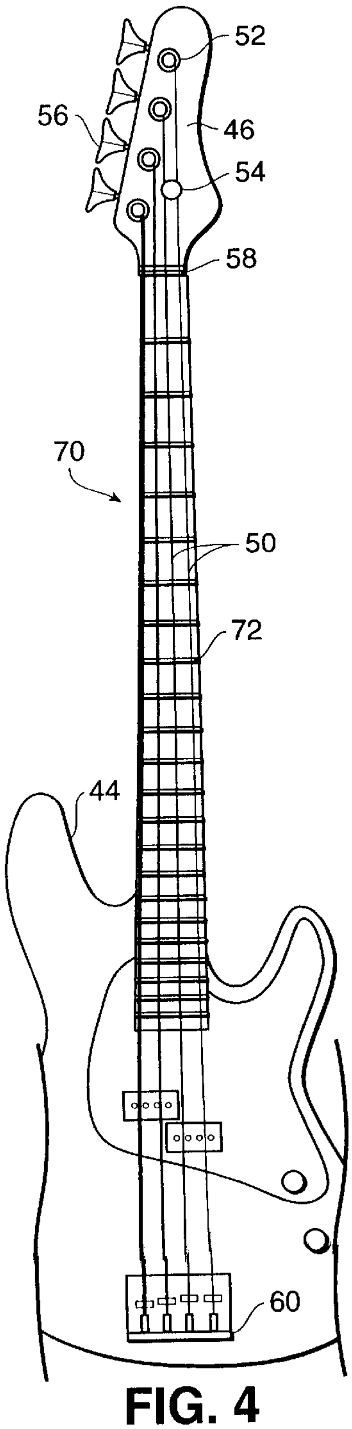
FIG. 4
FIG. 5
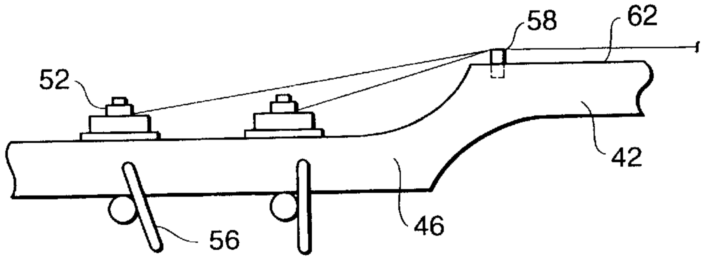

STRINGED MUSICAL INSTRUMENT WITH SUBSTITUABLE FINGERBOARDS

RELATED APPLICATION

This application is a continuation-in-part of my co-pending U.S. utility patent application Ser. No. 09/531,719, filed Mar. 20, 2000, entitled "SYSTEM OF STRINGED MUSICAL INSTRUMENTS WITH SUBSTITUTABLE FINGERBOARDS" which is, in turn, a continuation of my U.S. utility patent application Ser. No. 09/273,179, filed Mar. 19, 1999, U.S Pat. No. 6,156,961 entitled "STRINGED MUSICAL INSTRUMENT WITH REMOVABLE FINGERBOARD" and which is, in turn, a continuation-in-part of my U.S. utility patent application Ser. No. 09/161,246, filed Sep. 25, 1998 (now U.S. Pat. No. 6,037,532, dated Mar. 14, 2000), and entitled "STRINGED MUSICAL INSTRUNET WITH REMOVABLE FINGERBOARD" and which in turn, assumes the benefit of and claims priority from my U.S. provisional patent application Ser. No. 60/089,776, filed Jun. 18, 1998, and entitled "STRINGED MUSICAL INSTRUMENT NECK WITH CHANGEABLE FINGERBOARD AND "T" SHAPED TRUSS" (now expired).

BACKGROUND OF THE INVENTION

1. Field of the Invention

This invention relates in general to certain new and useful improvements in stringed musical instruments and, more particularly, to stringed musical instruments of the type having an elongate neck and a body and which are capable of generating sounds in response to vibration of strings extending across that body and with fingerboards substitutable for one another on the neck of that instrument and with a unique interlocking means cooperating between the neck of the musical instrument and the fingerboard to allow removable attachment of the fingerboards to the neck of the instrument.

2. Brief Description of the Related Art

In stringed musical instruments the useful or active length of the string is adjusted by pressing the string against a fingerboard on the upper surface of the neck. In generally all cases, the fingerboard is an integral part of the neck of the musical instrument, or otherwise it is permanently affixed to the neck. However, some musical instruments are provided with frets on the fingerboard and are typically referred to as "fretted" musical instruments which allows the user to engage the string of the instrument against a fret so that a useful length is achieved equal to the distance between the fret and the bridge. This will create a note of precisely defined timber and also of metallic character. Other instruments without frets are often referred to as "fretless" instruments and the useful length of the string is determined by the distance between the point at which the player keeps the string pressed against the fingerboard and the bridge. In absence of the fret, there is a lack of metallic quality to the sound and the sound also has a softer character.

It is, however, important in connection with any stringed musical instrument to insure that the distance between the string in its normal unactuated condition and the upper surface of the fingerboard is precisely controlled and remains the same. Otherwise, if this distance should effectively change, even by a small amount, the musical quality of the instrument is altered and frequently to the detriment of the generated sounds. Moreover, it is critical in connection with any stringed musical instrument to insure that the fingerboard is tightly mounted onto the neck of the musical instrument. Otherwise, vibrations between the fingerboard and the neck of the instrument would be generated and this, again, results in a deficit of the musical quality.

It may be appreciated that for certain musical pieces, fretted instruments are desired and for other musical pieces, fretless instruments are desired. However, since there is no convenient means for altering an instrument with frets, or without frets, the average musician must constantly carry at least two such instruments, one containing frets and one without frets. In particular, for the base guitar and the slide or so-called "bottle neck" six-string guitar, each player almost inevitably carries at least two musical instruments for this purpose. However, this limits the player in attaining the desired musical flexibility while retaining the feel and capabilities of a preferred instrument.

There have been at least two proposals to provide a stringed musical instruments with interchangeable fingerboards. One such proposed arrangement is set forth in U.S. Pat. No. 4,137,813, dated Feb. 6, 1979, to Stone, et al. In this patent, Stone, et al proposed interchangeable fingerboards having differed fret arrangements, but never suggested the concept of substituting a fretted board for a non-fretted board. Sonte, et al did suggest the mounting of a fingerboard to a musical instrument in a detachable fashion, but pointed out the critical problem of potential vibration which can result between the neck of the instrument and the fingerboard. The Stone, et al '813 patent, however, proposed groove arrangements in both the underside of the fingerboard and the upper surface of the instrument neck.

In U.S. Pat. No. 4,132,143, dated Jan. 2, 1979, to Stone, the patentee employs a plurality of very closely spaced apart grooves on the underside of the fingerboard and projections on the upper surface of the neck. These grooves and projections are longitudinally spaced apart from one another by very short distances and, hence, a large number of such grooves and projections are employed. Although Stone may potentially eliminate the problems of vibration, this arrangement also creates a rigidity and does not allow the fingerboard to conform to the arc of the neck accounting for the normal flexing of the neck and makes insertion of the fingerboard virtually impossible. Consequently, the arrangements in the Stone, et al '183 and in the Stone '143 patents have not been effectively commercially utilized.

U.S. Pat. No. 4,852,450 to Novack also discloses different fret arrangements for use on musical instruments. However, the fingerboards containing these different fret patterns are not removably mounted on the neck of the musical instrument, as such.

There have been several attempts in the prior art to provide stringed musical instruments in which frets can be used or withdrawn. In U.S. Pat. No. 4,297,936 to Mouton, there is provided a stringed musical instrument having retractable frets. In this case, an electric base guitar is provided with retractable frets, such that in one position, the frets are flush with the surface of the fingerboard and, in another position, the frets are raised above the surface of the fingerboard. The neck of the instrument has an inclined slope on one side causing wedge shaped feet on the frets to ride on this inclined slope for raising and lowering the frets.

There is a also a proposed stringed musical instrument having retractable frets described in U.S. Pat. No. 4,722,260 to Pigozzi. In this case, a guitar has a fingerboard in which the frets are slidably disposed within the neck holding the fingerboard. a rather complex mechanism, including cams, springs and a rotatable shaft, are provided for raising and lowering the frets. While this type of instrument may be attractive in theory, as a matter of practicality, the mechanism used is quite complex and significantly adds to the overall weight, and certainly to the cost of the musical instrument.

In each of the aforesaid prior art systems for providing frets and effectively removing frets, they would be inherently slow and cumbersome. Consequently, these systems are not effective for the average musician who desires to quickly change from a fretted instrument to a fretless instrument. As a result, systems of the types proposed in these patents have not been effectively used.

There has clearly been a need for a single musical instrument which can be properly tuned and adapted to the particular use of a certain musician. Clearly, the complex and unworkable proposals advanced in the Pigozzi patent and in the aforesaid patent to Mouton have not been effective and not usable in terms of converting a single musical instrument from a fretted instrument to a non-fretted instrument. Moreover, and although the aforesaid Stone patents suggested the changing of fingerboards, Stone never suggested the alteration of the same musical instrument from a non-fretted to a fretted instrument. In addition, the interlocking arrangement of the fingerboard to the neck of the musical instrument was literally unusable in actual operation due to the complexity and difficulty of changing one fingerboard for another. Thus, this need has existed and still remains.

In each of the aforesaid utility patent applications, there are provided means for releasably attaching the fingerboards to the neck of the musical instrument. In each of those aforesaid utility patent applications, the attachment means relied upon longitudinally spaced apart upstanding interlocking elements with interlocking grooves on the underside of the removable fingerboards. In the present invention, there is provided an even more improved means for attaching the fingerboards to the neck of the musical instrument.

OBJECTS OF THE INVENTION

It is, therefore, one of the primary objects of the present invention to provide a stringed musical instrument of the type having an elongate neck with a plurality of fingerboard which are easily and readily substitutable for one another on the neck of the musical instrument.

It is a further object of the present invention to provide a stringed musical instrument of the type stated in which one fingerboard can be rapidly removed from the neck of a musical instrument and another fingerboard inserted back onto the neck of the musical instrument by initially shifting the fingerboard laterally with respect to the neck of the musical instrument and then slidably shifting the fingerboard longitudinally to install the fingerboard on the neck.

It is another objection of the present invention to provide a stringed musical instrument of the type stated in which a fretted fingerboard can be substituted for a non-fretted fingerboard and vice versa by using the shiftable movement mentioned above.

It is another object of the present invention to provide a stringed musical instrument of the type stated in which the thicknesses of the substitutable fingerboards and the means for mounting the fingerboards are maintained so that the distance between the playing surface of the fingerboard and the strings of the instrument effectively remain the same.

It is also an object of the present invention to provide a stringed musical instrument of the type stated in which fingerboards can be rapidly replaced for one another and removably mounted on the neck of the musical instrument by insertion of longitudinally extending upstanding locking element on the neck of the musical instrument in a corresponding groove located to receive that locking element on the underside of the fingerboard.

It is an additional object of the present invention to provide a stringed musical instrument of the type stated in which the locking means for releasably locking a fingerboard to the neck of the musical instrument also provides for proper lateral alignment of the fingerboard and proper longitudinal alignment of the fingerboard with respect to the neck of the musical instrument when mounted thereon.

It is still a further object of the present invention to provide a method of converting a stringed musical instrument from a fretted musical instrument to an unfretted musical instrument.

It is yet another object of the present invention to provide a method for mounting a fingerboard on the neck of a musical instrument by initially shifting the fingerboard laterally and then shifting the fingerboard longitudinally with respect to the neck of the musical instrument.

With the above and other objects in view, my invention resides in the novel features of form, arrangement and combination of parts and components presently described and pointed out in the claims.

BRIEF SUMMARY OF THE INVENTION

The present invention relates in general to stringed musical instruments of the type which have an elongate neck and a body with a resonant cavity at one end of the neck and a head at the other end of the neck. Strings are stretched across the neck and over the resonant cavity body. Vibration of the strings results in the generation of musical sounds. This holds true for both the non-electric type musical instrument, as well as electrical musical instruments. The latter type of instrument is fitted with transducers to enable the generation of musical sound.

In the illustrated embodiment of the invention, as hereinafter set forth, an electric base guitar is illustrated. Moreover, this instrument is provided, in normal construction, with four strings. However, any stringed musical instrument, e.g., five string, six string musical instruments, etc., can also be used in accordance with the present invention. Although the invention is designed for the substitution of fretted fingerboards for non-fretted fingerboards and of non-fretted fingerboards for fretted fingerboards, it should be recognized that the attachment means used for attaching the fingerboards to the neck of the musical instrument could be used for attaching one type of fingerboard for another, whether or not fretted or non-fretted.

In all embodiments of the invention, a fingerboard is provided on the neck of the musical instrument. This invention relates in a broad aspect to a means for removing a fingerboard, such as a fretted fingerboard and substituting on the neck a non-fretted fingerboard and vice versa. Preferably, although not necessarily, the means for removing the fingerboard and repositioning a different fingerboard does not require manually manipulating mechanical fasteners.

It is important in connection with the present invention that the removal of one fingerboard and the remounting of another fingerboard be accomplished very quickly and with minimal amount of manual manipulation. In this way, a musician can readily change from a fretted musical instrument to an non-fretted musical instrument using essentially the same musical instrument, but with different fingerboards and without need for readjustment of the instrument.

It is also important in connection with the present invention to insure that when the fingerboard is mounted to the neck of the musical instrument, there is no relative vibration existing between the fingerboard and the neck of the instrument. In other words, the fingerboard should not vibrate independently of the neck of the instrument. In addition, it should not bind the neck and otherwise inhibit the neck from its natural bending or bowing function.

In addition to the foregoing, the height of the fingerboard relative to the underside of the strings must be carefully maintained. There is a precise pre-established distance between the strings and the surface which is contacted by the strings during the playing of the musical instrument. In the case of the fingerboard having frets thereon, the strings would be normally depressed for a lesser distance then they would be if a fingerboard was used on the instrument and the strings were pushed into contact with the surface of that fingerboard. In that event, the musical instrument would effectively be out of adjustment when substituting a fretted fingerboard for a non-fretted fingerboard and vice versa.

In accordance with the present invention, the non-fretted fingerboard has a thickness which is greater than the thickness of the fretted fingerboard by the height of the frets on the fretted fingerboard. In other words, the thickness of the fretted fingerboard plus the distance that the frets extend above the fretted fingerboard is equal to the overall thickness of the fretless fingerboard. In this way, the strings will be depressed for the same distance on both the fretted and the non-fretted fingerboard.

The present invention actually provides a unique and highly effective mounting means for releasably mounting the fingerboard to the neck of the musical instrument. This locking means does not require the need for mechanical fasteners to be manipulated or adjusted. In my co-pending U.S. patent application Ser. No. 09/273,179, filed Mar. 19, 1999, for a System of Stringed Musical Instruments with Substitutable Fingerboards, there are several locking systems provided for releasably locking a fingerboard to the neck of the musical instrument. In general, each of those locking system normally rely upon a transverse slidable shifting movement of the fingerboard with respect to the neck of the musical instrument to cause at least one or more transversely arranged locking elements to engage the fingerboard in the transverse movement. In contrast, the present invention provides a highly unique and very effective locking system which was heretofore unavailable.

In accordance with the present invention, longitudinally arranged interlocking elements are located on the upper surface of the neck of the musical instrument and on the underside of the fingerboard. These locking elements may adopt the form of a single longitudinally arranged upstanding locking element on the neck of the musical instrument and a corresponding longitudinally arranged groove on the underside of the fingerboard. Moreover, the locking element is preferably wedge-shaped and the corresponding groove is similarly wedge-shaped. Thus, the upstanding locking element is provided with an upwardly and outwardly tapering side wall edges and the groove is similarly formed with upwardly and outwardly tapering walls to receive the corresponding edges of the locking element. In addition, the wedge-shaped upstanding locking element is provided with a double taper, in that the overall transverse width increases from one end of the locking element to the other. In like manner, the groove on the underside of the fingerboard increases with the same dimensional rate so as to again correspondingly receive the upstanding locking element.

It is important for the wedge-shaped upstanding locking element to extend all the way to the end of the neck adjacent to the head of the musical instrument, that is, until it effectively abuts the nut. It is also desirable to have the opposite end of the wedge-shaped upstanding locking element and, of course, the corresponding groove extend to the opposite ends of the neck. However, in one embodiment, the groove and upstanding locking element can terminate at a point spaced from the end of the neck adjacent to the body of the musical instrument.

By virtue of the above-identified construction, the fingerboard is initially shifted transversely or laterally from one longitudinal side of the neck of the musical instrument until it is disposed over the neck of the musical instrument. At that point, the fingerboard can be lowered to engage the upstanding locking element in the groove of the fingerboard. The fingerboard is then shifted longitudinally so that the double wedge locking element tightly engages the correspondingly shaped and sized groove on the underside of the fingerboard. As this occurs, the fingerboard will slide longitudinally toward the head of the musical instrument where it will come to rest, that is, until the end of the fingerboard is located in closely spaced relationship to or otherwise abutting relationship at the neck of the musical instrument.

When the groove and the locking element is formed with the proper tolerance, the fingerboard will precisely come to rest when the fingerboard is in proper marginal registration with the neck of the musical instrument. In addition, the fingerboard will also come to rest when it is in a proper longitudinal position with respect to the neck of the musical instrument. The use of the dovetail construction mentioned above on the longitudinally extending interlocking element has thus been proved to be highly effective in the present invention.

It is also possible to use end locking elements if desired as, for example, an interlocking element in the nature of a ball and detent arrangement. This ball and detent arrangement, to the extent employed, precisely locks the fingerboard in marginal registration with the edges of the neck and also applies an upwardly biasing force which, in turn, further causes a greater locking force between the fingerboard and the musical instrument.

It is also possible to form the neck of the musical instrument of laminated layers as, for example, layers of plastic and wood so as to provide increased strength. Further, the neck of the musical instrument could also be formed of reinforced plastic composite materials, such as boron with epoxy resins or carbon fibers with epoxy resins, and the like. Reinforcement could also be provided by other forms of reinforced plastics as, for example, other metals and fibers along with thermoplastic or thermosetting resins.

The present invention thereby fulfills the above and other objects and advantages in the provision of both an improved musical instrument and a method for modifying the musical instrument to provide for removable fingerboards. The improved musical instrument and the method of the invention is further exemplified by the following details description and the accompanying drawings. However, it is to be understood that this following detailed description and the accompanying drawings are set forth only for purposes of illustrating the general principles of the invention. Therefore, this following detailed description and the accompanying drawings are not to be taken in a limiting sense.

BRIEF DESCRIPTION OF THE DRAWINGS

Figure 1:
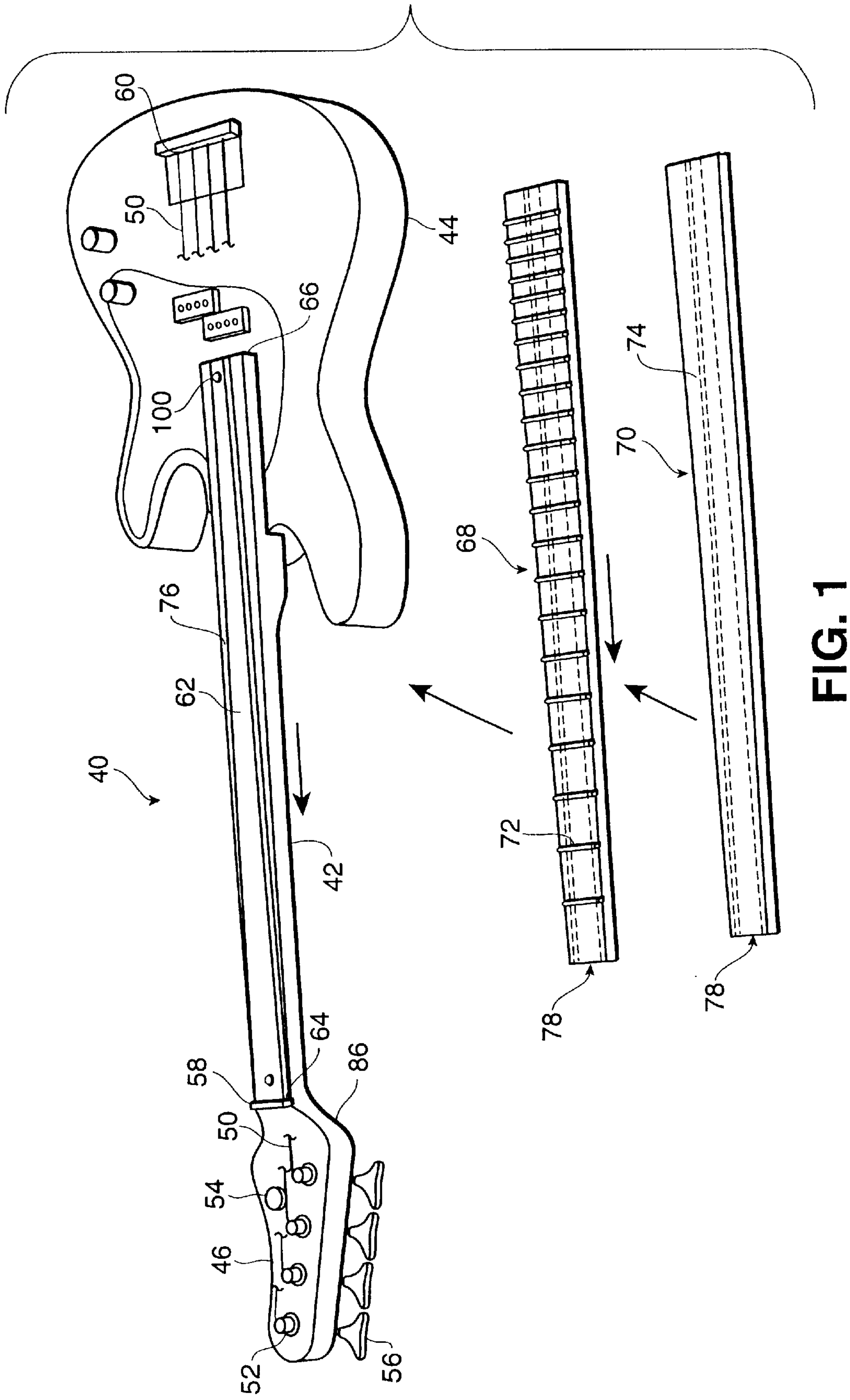
Figures 6, 7, 8, 9:
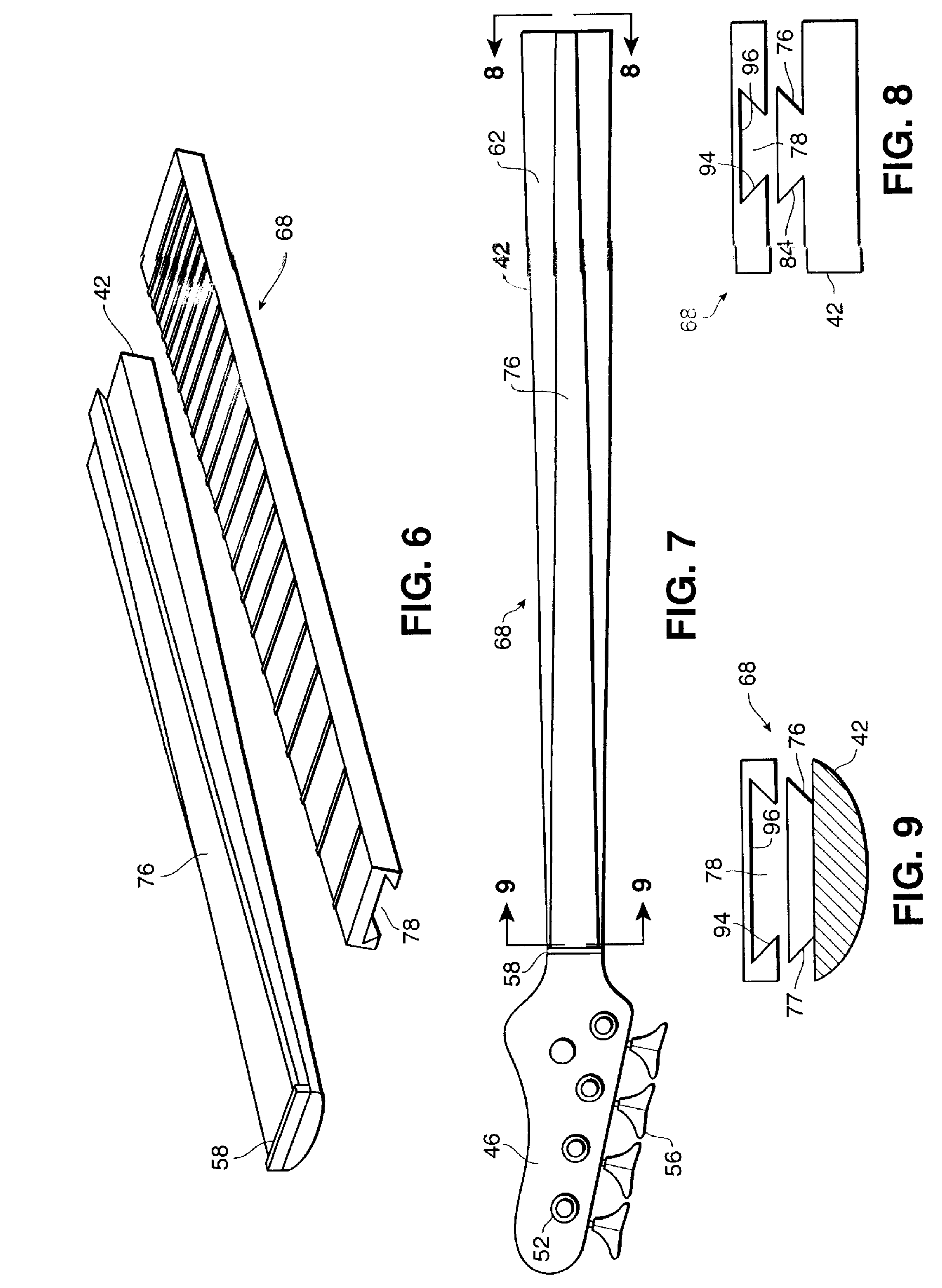
Figure 10:
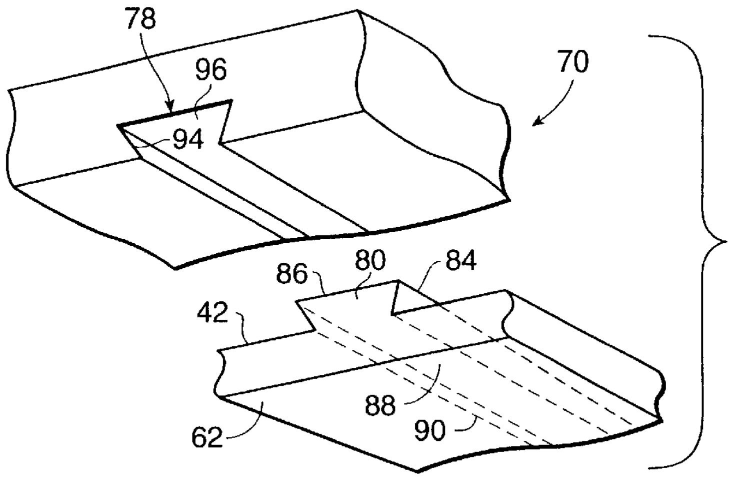
Figure 13:
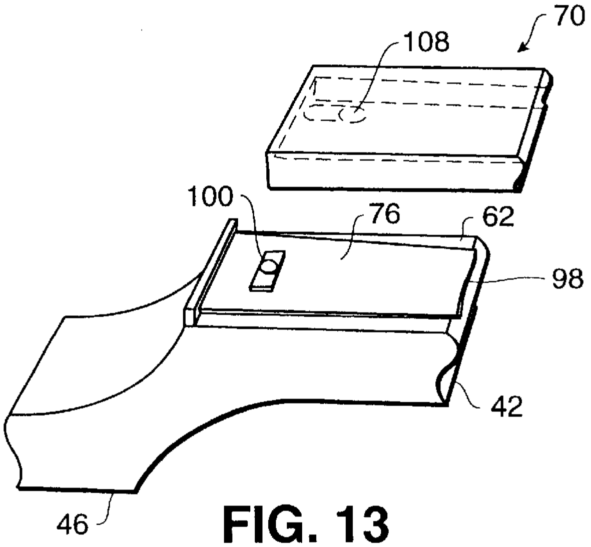
Figure 14:
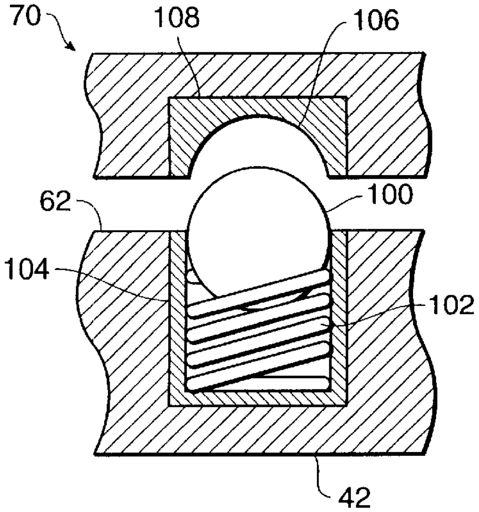
Figure 15:
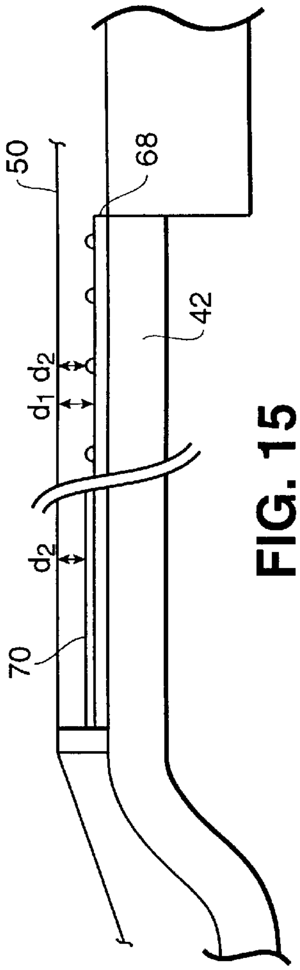
Figure 11:
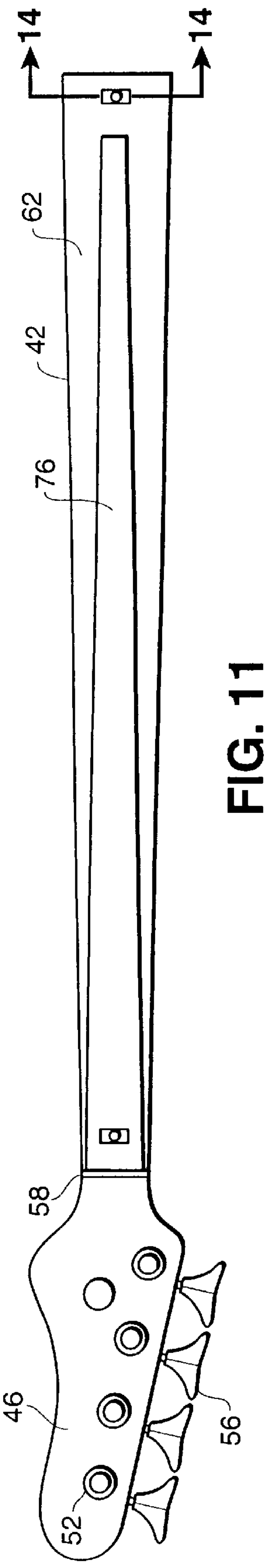
Figure 12:
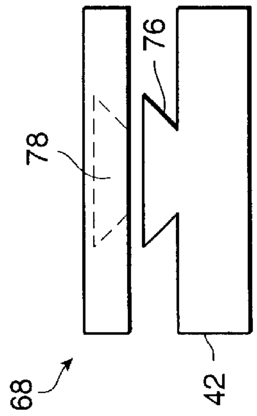
Figure 16:
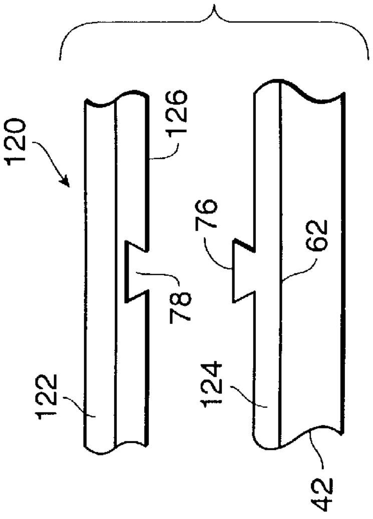

Having thus described the invention in general terms, reference will now be made to the accompanying drawings (six sheets) in which:

FIG. 1 is an exploded perspective view of a stringed musical instrument constructed in accordance with and embodying the present invention and conceptionally showing substitution for fingerboards on the neck of a musical instrument and the movement pattern associated therewith during the substitution process;

FIG. 2 is a fragmentary top plan view of the stringed musical instrument of FIG. 1 and showing a removable fingerboard in a position where it is being mounted on or removed from the neck of the musical instrument and the initial shifting movement of the fingerboard with respect to the neck of the instrument;

FIG. 3 is a fragmentary top plan view of the musical instrument of FIG. 1, similar to FIG. 2, and showing the fingerboard in a position where it is being longitudinally shifted with respect to the neck of the musical instrument in accordance with the present invention;

FIG. 4 is a fragmentary top plan view of the musical instrument of FIG. 1, similar to FIGS. 2 and 3, and showing a fingerboard in a position where it is fully mounted on the neck of the musical instrument;

FIG. 5 is a fragmentary side elevational view of the head of the musical instrument of FIG. 1 showing the mounting of strings thereon;

FIG. 6 is an exploded top plan view of the musical instrument of the invention with a fingerboard removed therefrom and showing a preferred locking arrangement for mounting the fingerboard to the musical instrument;

FIG. 7 is a fragmentary top plan view of the neck of the musical instrument with an upstanding interlocking element formed thereon;

FIG. 8 is an exploded end view taken along line 8—8 of FIG. 7;

FIG. 9 is a sectional view taken along line 9—9 of FIG. 7;

FIG. 10 is a fragmentary exploded perspective view showing the details of the dovetail shape and size of the interlocking elements for locking the fingerboard onto the neck of the musical instrument;

FIG. 11 is a fragmentary top plan view of the neck of a modified form of musical instrument in accordance with the present invention and with an upstanding interlocking element formed thereon;

FIG. 12 is a right-hand end elevational view of the embodiment of the musical instrument of FIG. 11 if the fingerboard were separated and spaced above the neck of the musical instrument;

FIG. 13 is a fragmentary perspective view showing a form of end locking means for holding a fingerboard in a marginally aligned position on the neck of the musical instrument of FIG. 11;

FIG. 14 is a fragmentary sectional view taken along line 14—14 of FIG. 11;

FIG. 15 is a schematic view showing the positioning of a fretted and a non-fretted fingerboard in the neck of a musical instrument to compensate for differences in thicknesses thereof; and FIG. 16 is a fragmentary end elevational view showing a preferred fingerboard construction in which the interlocking elements for holding the fingerboards onto the neck of a musical instrument are separately formed on individual plates.

DETAILED DESCRIPTION OF A PREFERRED EMBODIMENTS

Referring now in more detail and by reference characters to the drawings, which illustrate preferred embodiments of the present invention, reference numeral 30 represents a stringed musical instrument which has interchangeable fingerboards, as hereinafter described. In particular, the invention primarily relies upon the substitutability of one fingerboard for another type of fingerboard on the same musical instrument and, even more preferably, the substitutability of a fretted fingerboard for a non-fretted fingerboard on the same musical instrument. for purposes of describing the present invention, a guitar has been illustrated in the drawings, although it should be understood that any of the stringed musical instruments of the type previously described could be constructed with the interchangeable fingerboard construction of the invention.

The musical instrument 40 generally comprises an elongate neck 42 having a body 44 at one end and a head 46 at the opposite end. a plurality of wires, commonly referred to as “strings” 50 are secured to pins 52 on the head 46 and trained around guide posts 54 for extension over the neck of the musical instrument and the body 44. These strings 50 are tunable by means of tuning knobs 56 connected to the pins 52 in a conventional manner. At their opposite ends, the strings 50 are secured to the body of the musical instrument, also in a conventional fashion.

The actual construction of the head 46 and the components thereon, as well as the body 44, is conventional and therefore is neither illustrated nor described in any further detail herein. In this respect, the invention as described herein is equally applicable to both non-electrical string musical instruments and electrical versions of these musical instruments. Insofar as the present invention is concerned, either version would operate in the same way.

The strings 50 of the musical instrument are extended over and trained against a transversely extending protrusion 58 at the region of joinder of the neck 42 to the head 46 and which is typically referred to as a nut. In this respect, the strings 50 have been broken away or eliminated in some of the drawing figures, for purposes of clarity. At its right-hand end, that is, adjacent the body 44, the musical instrument is provided with another transverse upwardly extending projecting element or so-called “protrusion” 60 typically referred to as the “bridge”.

The principle underlying reasons why the present invention provides an effective means for substituting a fretted fingerboard for a non-fretted fingerboard, and vice versa, relies on a combination of several unique features, as hereinafter described in more detail. These features include, for example, and are primarily responsible for the fact that a fingerboard can be removed very quickly and easily without any binding on the neck of the musical instrument and a new fingerboard inserted in its place without undue attention by the musician and, moreover, in a very quick time period in a musical performance. Thus, it is this combination of features which gives rise to the effectiveness and the actual utility in substituting a fretted fingerboard for a non-fretted fingerboard and vice versa.

The major factor which give rise to this unique ability is the fact that there is a unique interlocking system for releasably locking the fingerboard to the neck of the musical instrument. a beveled projection fits within a beveled groove which serves as locking elements and optionally rely upon end locking elements which utilize a spring biased ball fitting in a detent or similar arrangement. Another one of these features that gives rise to this advantage is the fact that the interlocking elements are provided with a dovetail construction and this dovetail construction exists entirely for the full longitudinal dimension of the interlocking elements on the fingerboard and the neck of the musical instrument. The tapered aspect of the interlocking elements allows easy insertion of the fingerboard onto the upstanding locking element and, when fitted thereon, is tightly retained on the neck of the musical instrument.

The applicant has also found that it is desirable to use only a single longitudinal locking element. As a result, the fingerboard does not restrain the normal flexibility of the neck and, moreover, does not vibrate independently of the neck of the musical instrument. In addition, the applicant has also found that the distance that the string is pushed downwardly to engage a surface of a fingerboard is always the same with the fretted fingerboard or with the non-fretted fingerboard. All of the above features operate in concert to enable this interchangeability of fretted for non-fretted fingerboards and, without these unique features, the fingerboards would not be interchangeable for one another with the same degree of effectiveness.

By reference to FIG. 1, it can be seen that the neck 42 is not presently shown with a fingerboard on its upper surface 62. The nut 58 and the opposite end of the neck define opposite edges 64 and 66 in proximity respectively to the head 46 and in proximity to the body 44, respectively, and which defines the length of a fingerboard to be fitted on the upper surface 62. Due to the fact that there is no fingerboard presently located on the neck, as shown in FIG. 1, the overall thickness of the neck is less than it would otherwise be when a fingerboard is fixedly mounted on that neck. In addition, and although the major portion of the length of the neck is of reduced thickness to accommodate a removable fingerboard, as hereinafter described, the neck could have a reinforcing member located therein.

Provided for removable mounting on the upper surface 62 of the 20 neck 42 is either a fingerboard 68 or a fingerboard 70. In this embodiment, the fingerboard 68 is provided with a plurality of upstanding protrusions 72 or so-called "frets" extending transversely across the fingerboard, as shown in FIGS. 1, 2 and 3. In this way, a player of the musical instrument can effectively modify the length of the strings between the point where the musician engages the strings on a selected fret 72 and the bridge 60. The fingerboard 70 is provided with a relatively smooth upper surface, as shown in FIGS. 1 and 4, and, therefore, constitutes a non-fretted fingerboard.

When the fingerboards 68 and 70 are located on the upper surface 62 of the neck 42, the fingerboards will precisely marginally align with the edge of the nut 58. FIG. 1 further shows the direction of movement of the fingerboards 68 and 70 in order to mount the same onto the neck of the musical instrument. It can be observed that initially there is a transverse shifting movement of the fingerboard generally under the strings of the musical instrument until it is approximately longitudinally aligned with the longitudinal edges of the neck. Thereafter, there is a longitudinal shifting movement of the fingerboard rearwardly toward the neck of the musical instrument, that is, toward the left as shown in FIG. 1.

FIGS. 2–4 more fully illustrate the position of the fingerboard with respect to the neck of the musical instrument when mounting the fingerboard onto the musical instrument. In this particular case, FIGS. 2–4 illustrate the mounting of a fretted fingerboard. However, the mounting of a non-fretted fingerboard or any other type of fingerboard would use the same pattern of movement.

When referring to FIG. 2, it can be observed that a fingerboard 68 is being shifting transversely toward the neck 42 from one longitudinal side thereof. Thus, in FIG. 2, the fingerboard is still laterally offset from proper marginal registration with the neck 42 of the musical instrument and, moreover, it is shifted downwardly toward the head 44 of the musical instrument in order to enable a groove formed on the underside of the fingerboard to slidably accommodate an upstanding locking element on the neck of the musical instrument, as hereinafter described in more detail. The fingerboard would be shifted transversely until it is in a position where the longitudinal edges are essentially marginally registered with the longitudinal edges of the neck of the musical instrument. At that point, the fingerboard is then shifted longitudinally toward the nut 58 in the direction of the longitudinal arrow in FIG. 3. Thus, it can be seen in FIG. 3 that the fingerboard is initially in its position where it will start the longitudinal shifting movement. FIG. 4 illustrates the position of the fingerboard when it has reached the fully locked position.

By reference to FIG. 1, it can be seen that the fretted fingerboard 68 is provided with a plurality of longitudinally spaced apart generally transversely extending upstanding frets 72. The size and spacing of the frets is essentially conventional and in accordance with the standard practices normally adopted in stringed musical instruments. The fretless fingerboard 70 is provided with a relatively flat upper surface 74.

One of the preferred means for removably mounting the fingerboards is more fully illustrated in FIGS. 1 and 6–10 of the drawings. This mounting means relies upon an individual upstanding formation or protrusion 76 on the neck of the musical instrument which function as a locking element and which longitudinally extends across the length of the neck 42. This single locking element 76 cooperates with a cooperating locking element in the form of a groove 78 on the underside of the fingerboard. The projection 76 is located midway between longitudinal edges of the neck 42, as best shown in FIGS. 6 and 7 of the drawings. In like manner, the groove 78 is aligned with the individual projection 76 and also extends longitudinally across the fingerboard. In this respect, it should be understood that the projection could be mounted on the underside of the fingerboard to mate with a corresponding groove formed on the upper surface of the neck 42.

In the embodiment of the invention as illustrated, and particularly by reference to FIGS. 7–9, it can be seen that the upstanding locking 76 extends to the full end of the neck almost to a point where it is adjacent to the nut 58. In like manner, the groove 78 formed on the underside of the fingerboard 68 and, for that matter, the like groove 68 formed on the underside of the fingerboard 70 would also fully extend to the end of the fingerboard where it would be positioned adjacent to the neck. This is important inasmuch as there could potentially be a hollow space between the end of the groove and the upstanding locking element which would cause a resonant sound thereby interfering with the desired sounds of the musical instrument. Moreover, and in accordance with the embodiment as shown in FIGS. 7–9, and particularly by reference to FIGS. 7 and 8, it can be seen that the locking element 76 and the corresponding groove 78 also extend to the opposite end of the neck where it would be adjacent to the body 44 of the musical instrument. Thus, the groove 78 would open at each of the transverse ends of the fingerboard 68.

It is also possible to provide a locking element and corresponding groove of the type shown in FIGS. 11 and 12. In this particular case, it can be observed that the fingerboard 76 does extend to the left-hand end of the neck 42 where it is adjacent to the nut 58. However, the opposite end of the fingerboard where it would be adjacent to the body 44 terminates inwardly of the end of the neck 42. FIG. 12 shows this arrangement as if the fingerboard were spaced above the neck of the musical instrument and the upstanding locking element 76.

Nevertheless, in connection with the preferred embodiment as shown in FIGS. 6–8, it can be observed that the projection 76 and the corresponding recess or groove 78 do extend for the full longitudinal dimension along the neck 42 and the fingerboard, respectively. They terminate at the transverse edges thereof. In this way, when the fingerboard is slid onto the neck 42 from one longitudinal side thereof, the longitudinal registration of the fingerboard with the neck of the musical instrument is readily obtained. However, it is important that in all embodiments at least the groove 78 open on one transverse end of the fingerboard.

The locking element projection 76 is formed with beveled side walls 84 and which are beveled so that the side walls 84 converge inwardly and downwardly toward one another, such that the locking element 76 has a wider top surface than bottom. This structure is best shown in FIG. 8. Moreover, the projection 76 is provided with a flat upper surface 86. The side walls 84 also converge from one transverse end toward the other and toward one another at a downwardly and inwardly tapered end face 77. In this way, the projection 76 is tapered slightly but continuously from the nut 58 to the end face 77 forming a dovetail construction, as shown in FIGS. 6–9.

The groove 78 is similarly formed so as to snugly, but nevertheless, removably accommodate the locking projection 76. The groove 78 is similarly formed with inner transversely extending, upwardly and outwardly diverging beveled walls 94 and connected by a flat top wall 96. In effect, the projection 76 and the groove 78 are each formed with a dovetail construction. In this way, the projection becomes firmly, but nevertheless, removably locked within the groove 78 merely by sliding the fingerboard longitudinally and rearwardly toward the nut 58 onto the musical instrument. Moreover, there is a positive locking action along the two sides of the projection.

When the fingerboard is first installed on the neck of the musical instrument, it is shifted transversely across the neck until the groove 78 becomes generally aligned with the projection 76. Thereafter, the fingerboard is shifted from the right-hand end longitudinally toward the neck 58 until the end of the fingerboard abuts against the end of the neck 58. In this way, the groove on the fingerboard becomes physically attached to the upstanding locking element 76, in the manner as shown in FIGS. 1 and 4 of the drawings. When the fingerboard is slid off of the musical instrument in the opposite direction, the protrusion 76 will become easily and readily removed from the groove 78. The fact that the locking projection and the matching groove are tapered from one end toward the opposite end with respect to the neck 42 facilitates the entrance of the projection 76 into the groove 78. In this way, there is no need for precise alignment. The edges of the projection also facilitate the entry of the protrusion into the groove 78. Moreover, the fact that the projection 76 is tapered inwardly toward the end 77 also enables easy entry of this projection 76 into the groove 78.

It can be observed, by reference to FIGS. 6–8, that there is an actual interlocking of the neck to the musical instrument completely around the edges of the projection 76 and the corresponding groove 78. Moreover, this arrangement also provides precise marginal registration of the fingerboard on the neck of the musical instrument.

In addition to the foregoing, it is quite important to insure that the fingerboard does not flex independently of the neck. This consideration is also coupled with the fact that the normal bowing of the neck makes it difficult to mount a relatively straight fingerboard thereon. In addition, the normal flexing of the neck of the musical instrument and any fingerboard mounted thereon must not be inhibited. In the aforesaid U.S. Pat. No. 4,132,143 to Stone, the instrument, as shown, employs too many locking elements which are spaced too close to one another and which thereby makes the attachment of the fingerboard to the neck of the musical instrument quite difficult, if not impossible. In addition, the normal flexing, which would otherwise occur, cannot be destroyed. Any interference with normal flexing has a deleterious effect on the quality of the music thus generated.

It has been also found in connection with the present invention that the use of a single longitudinal locking element does not interfere with the normal flexing of the fingerboard, but nevertheless maintains the fingerboard in a tight position on the musical instrument.

It is also important to note that the fingerboard extends almost entirely for the full length from the nut 58 to the point of termination of the fingerboard at the body 44. In other words, there is no groove formed in the neck of the musical instrument. As a result, there is no ridge or valley at the end adjacent the nut and, moreover, the playing surface of the instrument is maintained at the same height for the full length of the fingerboard.

The present invention can also optionally utilize a differing type of end locking element 98, as best shown in the embodiment of FIGS. 11 and 13 of the drawings. This end locking element 98 provides for precise marginal alignment of the edge of the fingerboard with the edge of the neck of the musical instrument and, in addition, provides cooperating action with respect to the previously described locking element 76 and groove 78.

The end locking element, in a preferred embodiment, may adopt the form of a spring biased locking ball and detent arrangement. Thus, a spring biased ball 100, which is biased upwardly by the means of a spring 102, located within a canister 104 fitted within the upper surface 52 of the neck 42, would be biased upwardly into a detent 106 located in the downwardly presented surface of the fingerboard. In this case, if desired, a brass strip 108 can be mounted on the underside of the fingerboard and which is provided with this detent 106 for receiving the spring biased ball 100. The ball mechanism, including the spring biased ball 100, can also similarly be mounted on a strip 110 which is also fitted within the neck of the fingerboard, as shown in FIG. 13 of the drawings. Thus, when the fingerboard is slid into position on the neck of the musical instrument, the ball 100 will seat within the detent 105 and thereby releasably lock the fingerboard into position.

It can also be observed that a locking mechanism similar to the biased ball locking mechanism in FIG. 11 could be incorporated on the upper surface of the locking element 76, as best shown in FIG. 13. In this particular case, the brass strip 110 containing the locking element could be located adjacent to the edge of the neck 62 adjacent to the nut 58. Thus, a pair of end locking elements could also be used in accordance with the present invention.

From the standpoint of the musician who is inserting a fingerboard on the neck of the musical instrument, when the fingerboard has reached the limit of transverse movement, the musician will hear the click of the biased ball moving into the detent and will know that the fingerboard is precisely mounted in place.

It can be seen that the ball and detent arrangement provides not only the marginal alignment of the fingerboard on the neck of the musical instrument, but it only provides an upward biasing force to the fingerboard. This causes the locking protrusion 76 to be forced into tighter engagement with the cooperating locking groove 78. In this way, the two types of locking elements cooperate with one another. However, it should be recognized that other end locking means which provide an upwardly biasing force to the fingerboard could be used and include, for example, spring clips and the like.

The tapered shape of the interlocking element also not only makes it easy to insert the interlocking projection into the groove, but the taper provides a very effective locking action. Moreover, since the walls are tapered from one transverse end toward the opposite transverse end, that is, tapered in the longitudinal dimension, the projection very easily and readily enters into the groove and the locking action only takes place during the latter part of the movement of the fingerboard onto the neck of the instrument. This type of dovetail construction precludes all upward motion independently of the neck of the instrument. In effect, the locking element precludes uplifting movement of the fingerboard and the ball and detent arrangement precludes any transverse shifting movement of the fingerboard when locked into position.

As indicated previously, it is important to insure that the distance any string is moved to contact another surface is precisely the same whether that surface is on a fretted or non-fretted fingerboard. Otherwise, instrument adjustment problems will arise. By reference to FIG. 15, it can be observed that a fingerboard, such as a fretted fingerboard 68, is schematically illustrated as being mounted on the neck 42 of a musical instrument. It can be observed that the distance from the upper surface of that fingerboard 68 to the strings 50 is a distance $d_1$. In like manner, the distance from the upper surface of any of the frets 72 to the strings 50 is a distance $d_2$. Thus, the distance that the strings 50 is moved downwardly to contact the surface on a fretted fingerboard is that distance $d_2$. Inasmuch as the fretless fingerboard 70 is not provided with any frets, the thickness of that board is such that the distance between the upper surface of the fingerboard 70 and the strings 50 is also $d_2$. Thus, the fretless fingerboard has an overall thickness which is equal to the thickness of the fretted fingerboard plus the overall height of the frets 72 thereon.

FIG. 16 illustrates an embodiment of the invention which is highly effective for manufacturing with precise tolerances. In connection with this embodiment as well as the other following embodiments of the invention, like reference numerals will be used to represent like components.

In accordance with the modified form of stringed musical instrument, designated by reference numeral 120 in FIG. 14, the same construction of the instrument is used, as in the case of the musical instrument 40, previously described, except for the fact that the locking element in the form of the protrusion 76 is not formed on the upper surface 62 of the neck 42. In like manner, no corresponding locking element is formed on the underside of modified forms of fingerboard 122 which may be employed. Thus, the upper surface 62 of the neck 42 is generally flat, as shown in FIG. 14.

The locking arrangement between the fingerboard and the neck of the musical instrument is actually provided by thin plates 124 and 126 which are respectively secured to the upper surface 62 of the neck 42 and the underside of each of the fingerboards 122. In this particular embodiment, the upstanding projection which was previously formed on the upper surface of the neck 42 is now formed on the upper surface of the plate 124. In like manner, the notch or groove 78 which was formed on the underside of each of the fingerboards 68 and 70 are now formed on the underside of the plate 126, much in the same manner as they were previously formed. Further, the plate 124 is secured to the upper surface 62 of the neck 42 and the plate 126 is secured to the underside of the fingerboard 122, e.g. by adhesive or the like.

This embodiment of the invention is highly effective in that the two plates 124 and 126 can actually be injection molded or otherwise formed in conventional woodworking operations. Durable rigid plastics, such as polypropylene, can be used for this purpose. The entire plate assembly comprises the plates 124 and 126 which can be molded or otherwise formed with a high degree of precision to provide those tolerances necessary for a good interlocking fit of the projection in the groove. In addition, the precise alignment between the projection and the groove which are obtainable in a machining operation, for example, allows an ease of interfitting the projection in the groove. In this respect, the actual shape of the projection and the shape of the groove, along with their respective positioning, is identical to that shown in the arrangement of FIG. 1. The use of the plates 124 and 126, however, facilitates manufacturing and reduces the overall cost thereof.

It may be appreciated that the neck of the musical instrument may suffer reduced ability to withstand bending moment forces imposed on the neck because of the removal of material in that region. This is particularly the case, since the neck of the musical instrument in actual use is frequently subjected to bending moment forces. In addition, string tension will tend to create deformation of the neck. Thus, reinforcing, such as reinforcing strips in the instrument can be used for this purpose. These reinforcing strips may be formed of any metal or typical reinforced plastic composite materials as, for example, those materials mentioned above.

Thus, there has been illustrated and described a unique and novel musical instrument of the type having removable fingerboards substituted for one another. The present invention therefore fulfills all of the objects and advantages which have been sought. It should be understood that many changes, modifications, variations and other uses and applications will become apparent to those skilled in the art after considering the specification and the accompanying drawings. Therefore, any and all such changes, modifications, variations and other uses and applications which do not depart from the spirit and the scope of the invention are deemed to be covered by the invention.

Having thus described the invention, what I desire to claim and secure by Letters Patent is:

1. A stringed musical instrument capable of having a fingerboard rapidly removable from and remounted on a neck of the instrument, said musical instrument comprising:
   a) an elongate neck having a pair of longitudinally spaced apart longitudinally extending side sections;
   b) a fingerboard provided for removable attachment to said neck and having longitudinal edges which will extend longitudinally with respect to side walls of said neck;
   c) an upstanding longitudinally extending locking element on said neck and having beveled sections thereon;
   d) a longitudinally extending groove on a surface of said fingerboard sized to removably receive said locking element when said fingerboard is mounted on said neck;

e) strings extending across and along said neck and said fingerboard; and f) a sound generating member connected to said neck and causing generation of musical sounds in response to vibration of and to a selected engagement of the strings with the fingerboard.

2. The stringed musical instrument of claim 1 further characterized in that said locking element is constructed so that said locking element slides longitudinally into said groove from one end of said neck of said instrument toward the other to mount the fingerboard on the neck and out of the groove in the opposite direction to remove the fingerboard from the neck.

3. The stringed musical instrument of claim 2 further characterized in that said locking element is engaged in said groove such that the fingerboard can only be slid longitudinally off of said neck at one side and not immediately laterally from said neck.

4. The stringed musical instrument of claim 1 further characterized in that an end locking element comprises means for applying an upward biasing force to said fingerboard and thereby applies an uplifting force on the fingerboard to increase the locking action of the locking element.

5. The stringed musical instrument of claim 1 further characterized in that said locking element has beveled side walls which are tapered longitudinally from one end of the neck to the other allowing said fingerboard to be easily slidable onto said neck and off of said neck to remove same from said neck.

6. The stringed musical instrument of claim 5 further characterized in that said locking element is beveled on its side walls, such that it has wider upper portions than lower portions preventing lifting of the fingerboard.

7. The stringed musical instrument of claim 1 further characterized in that said locking element also limits sliding movement of the fingerboard both transversely and longitudinally when inserted onto said neck so that said fingerboard is in a proper position on the neck when it has reached its longitudinal limit of movement.

8. The stringed musical instrument of claim 1 further characterized in that the locking element and said groove is pre-formed on separate plates such that one plate has at least the projection thereon which fits into a groove formed in an upper surface of said second plate and said plates are respectively secured at said neck and fingerboard.

9. The stringed musical instrument of claim 1 further characterized in that said fingerboard is inserted onto said neck by first shifting said fingerboard laterally with respect to the neck and then longitudinally slidable onto said neck and extending lengthwise of said neck.

10. A stringed musical instrument capable of having a fingerboard rapidly removable from and remounted on a neck of the instrument, said musical instrument comprising:

a) an elongate neck having a pair of longitudinally spaced apart longitudinally extending side sections;

b) a first fingerboard removably attached to and extending across said neck and having longitudinal edges extending longitudinally with respect to side walls of said neck;

c) a second fingerboard substitutable on said neck for said first fingerboard;

d) an upstanding longitudinally extending locking element on said neck and having beveled sections thereon, said locking element having beveled side walls which are longitudinally tapered from one end of a region to receive a fingerboard on the neck to the other, such that said locking element has a wider upper portion than lower portion preventing lifting of the fingerboard, and allowing said fingerboard to be easily slidable onto said neck and off of said neck to remove same from said neck; and e) a longitudinally extending groove on a surface of said fingerboard sized and having corresponding shapes to removably receive said locking element when said fingerboard is mounted on said neck.

11. The stringed musical instrument of claim 10 further characterized in that said second fingerboard has a thickness which is equal to the thickness of the first fingerboard plus the thickness of the frets extending above a surface thereof so that the distance between the strings and a surface contacted thereby is the same with both fingerboards.

12. The stringed musical instrument of claim 10 further characterized in that an end locking element is located on said elongate neck for engaging an end section of the fingerboard, said end locking element being located in proximity to an end of the neck and having a different locking action than said upstanding locking element to increase the locking action provided by said locking element.

13. The stringed musical instrument of claim 10 further characterized in that said locking element is constructed so that said locking element slides into said groove from one end of said neck of said instrument toward the other to mount the fingerboard on the neck and out of the groove in the opposite direction to remove the fingerboard from the neck.

14. The stringed musical instrument of claim 10 further characterized in that strings extend across and along said neck and said fingerboard, and a sound generating member is connected to said neck and causes generation of musical sounds in response to vibration of said strings and in response to a selected engagement of the strings with the fingerboard.

* * * * *